United States Patent
Gamo et al.

(10) Patent No.: US 6,795,124 B1
(45) Date of Patent: Sep. 21, 2004

(54) EXTERNAL SYNCHRONIZATION SYSTEM USING COMPOSITE SYNCHRONIZATION SIGNAL AND CAMERA SYSTEM USING THE SAME

(75) Inventors: Naoyasu Gamo, Kanagawa (JP); Masaaki Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/394,532

(22) Filed: Sep. 10, 1999

(30) Foreign Application Priority Data

Sep. 14, 1998 (JP) .......................................... 10-259793

(51) Int. Cl.[7] .............................................. H04N 5/08
(52) U.S. Cl. ...................................... 348/525; 348/521
(58) Field of Search ................................ 348/525, 526, 348/529, 516, 521, 524

(56) References Cited

U.S. PATENT DOCUMENTS

| | | | | |
|---|---|---|---|---|
| 4,375,101 A | * | 2/1983 | Cerracchio | .................. 386/124 |
| 4,580,165 A | * | 4/1986 | Patton et al. | ............... 348/510 |
| 4,860,101 A | * | 8/1989 | Pshtissky et al. | .......... 348/518 |
| 5,686,968 A | * | 11/1997 | Ujiie et al. | .................. 348/524 |

* cited by examiner

Primary Examiner—Wendy R. Garber
Assistant Examiner—Matthew L Rosendale
(74) Attorney, Agent, or Firm—Frommer Lawrence & Haug LLP; William S. Frommer; Dennis M. Smid

(57) ABSTRACT

When a composite synchronization signal is used as a synchronization signal provided from an external source, since the period of the composite synchronization signal is irregular, it is impossible to perform phase adjustment on the composite synchronization signal before it is input to a timing controller IC. A camera system is provided in which the composite synchronization signal is used as a synchronization signal provided from the external source, a horizontal synchronization signal separated by a synchronization separation circuit contained in a timing controller IC is output once outside the timing controller IC, and phase adjustment is performed on this horizontal synchronization signal by an external phase adjusting circuit, after which it is again input to the timing controller IC, and an internal horizontal synchronization signal and an internal vertical synchronization signal, which are references for the operation of this system, are generated in accordance with the horizontal synchronization signal after the phase adjustment and the vertical synchronization signal separated by the synchronization separation circuit.

6 Claims, 11 Drawing Sheets

EXTERNAL SYNCHRONIZATION SYSTEM USING COMPOSITE SYNCHRONIZATION SIGNAL AND CAMERA SYSTEM USING THE SAME

BACKGROUND OF THE INVENTION

1. Field of the Invention

The present invention relates to a camera system and, more particularly, to an external synchronization camera system using a composite synchronization signal containing a horizontal synchronization signal and a vertical synchronization signal provided as a system synchronization signal from an external source.

2. Description of the Related Art

In a monitoring camera system, usually, a slave camera is synchronized by using synchronization signals (a horizontal synchronization signal HD, a vertical synchronization signal VD, and a composite synchronization signal SYNC containing these signals) for a master camera. This is a well-known technique called "external synchronization". In this external synchronization, a process is performed for causing the phase of the synchronization signal of the slave camera to coincide with that of the synchronization signal of the master camera. At this time, ultimately, video signals are input from a plurality of cameras to one monitor.

However, depending on the location at which the slave camera is disposed, the time required for the synchronization signal of the master camera to reach each slave camera differs. If locked as it is, an out-of-synchronization video is produced on the monitor. For this reason, in each slave camera, adjustments are made so that out-of-synchronization does not occur on the monitor by phase-shifting a synchronization signal provided from the master camera so as to absorb out-of-synchronization portions which occur on the monitor.

When out-of-synchronization adjustments by this phase shift are made, two methods are available: a method in which a horizontal synchronization signal HD and a vertical synchronization signal VD are used as synchronization signals provided from the master camera, and a method in which a composite synchronization signal SYNC containing a horizontal synchronization signal HD and a vertical synchronization signal VD is used. FIG. 8 shows each waveform of the horizontal synchronization signal HD, the vertical synchronization signal VD, and the composite synchronization signal SYNC of the EIA (Electronic Industries Association) method (NTSC (National Television System Committee)-compatible black-and-white method). Generally speaking, the synchronization signal provided from the master camera is input to a timing controller IC within the slave camera. The construction of a camera system for each method is described below.

First, referring to FIG. 9, a description is given of a camera system using a horizontal synchronization signal HD and a vertical synchronization signal VD as synchronization signals provided from the master camera. In FIG. 9, an output signal of a CCD image pickup device 101 is input to a signal processing IC 102 whereby various signal processings are performed thereon, after which the signal is output as a video signal Video-OUT. A timing controller IC 103 generates a CCD driving signal for driving the CCD image pickup device 101, a signal processing driving signal for driving the signal processing IC 102, etc.

Here, the horizontal synchronization signal HD (master HD) and the vertical synchronization signal VD (master VD) provided from the master camera are input to the timing controller IC 103 after passing through an HD phase adjusting circuit 104 and a VD phase adjusting circuit 105. Then, the external vertical synchronization signal VD is provided to a V period counter 106, as a reset signal therefor, within the timing controller IC 103. The V period counter 106 counts up for each horizontal scanning period (1H) and generates an internal vertical synchronization signal VD'.

On the other hand, in a phase comparator 107 within the timing controller IC 103, the external horizontal synchronization signal HD is compared in phase at the rise edges with an internal horizontal synchronization signal HD' which is generated by an internal HD generating circuit 108. This comparison result of the phase comparator 107 is provided to a PLL circuit 109. The PLL circuit 109 outputs a DC voltage corresponding to the comparison result of the phase comparator 107 and applies it across both ends of a variable-capacity diode 111 of a clock oscillator 110 which generates a clock 2MCK of a frequency twice as high as the master clock MCK which is a reference clock of this camera system.

In the camera system constructed as described above, phase shift for the external horizontal synchronization signal HD and the external vertical synchronization signal VD provided from the master camera is performed by the HD and VD phase adjusting circuits 104 and 105 before these signals are input to the timing controller IC 103. For the phase shift, generally, an analog monostable multivibrator having a simple circuit configuration is used.

This analog monostable multivibrator is capable of changing the phase of a signal by providing a fixed amount of a delay with respect to the fall or rise of the signal. Therefore, as is clear from the waveform chart of FIG. 8, phase adjustments can be performed on the horizontal synchronization signal HD and the vertical synchronization signal VD having a fixed period by the HD and VD phase adjusting circuits 104 and 105 using an analog monostable multivibrator, respectively.

Next, referring to FIG. 10, a description is given of a camera system using a composite synchronization signal SYNC as a synchronization signal provided from the master camera. In FIG. 10, an output signal of a CCD image pickup device 201 is input to a signal processing IC 202 whereby various signal processings are performed thereon and then the signal is output as a video signal Video-OUT. A timing controller IC 203 generates a CCD driving signal for driving the CCD image pickup device 201, a signal processing driving signal for driving the signal processing IC 202, etc.

Here, the composite synchronization signal SYNC (master SYNC signal) provided from the master camera is input to the timing controller IC 203, and the signal is separated into a horizontal synchronization signal HD and a vertical synchronization signal VD by a synchronization separation circuit 204 within the relevant IC 203. Then, the separated external vertical synchronization signal VD is provided to a V period counter 205, as a reset signal therefor, within the timing controller IC 203. The V period counter 205 counts up for each horizontal scanning period and generates an internal vertical synchronization signal VD'.

On the other hand, in a phase comparator 206, the separated external horizontal synchronization signal HD is compared in phase at the rise edges with an internal horizontal synchronization signal HD' which is generated by an internal HD generating circuit 207. This comparison result of the phase comparator 206 is provided to a PLL circuit 208. The PLL circuit 208 outputs a DC voltage corresponding to the comparison result of the phase comparator 206 and applies it across both ends of a variable-capacity diode 210 of a clock oscillator 209 which generates a clock 2MCK of a frequency twice as high as the master clock MCK which is a reference clock of this camera system.

In a manner as described above, in the camera system of the former case using a composite synchronization signal SYNC as a synchronization signal provided from the master camera, as is clear from the waveform chart of FIG. 8, the composite synchronization signal SYNC has mixed synchronization signals of a 1H period and a 1/2H period, and the period of the composite synchronization signal SYNC is irregular; it is thereby impossible to directly perform phase adjustment on the composite synchronization signal SYNC by using an analog monostable multivibrator before the signal is input to the timing controller IC 203.

Therefore, when phase adjustment is required in this type of camera system, as shown in FIG. 11, it is necessary to separate the composite synchronization signal into the horizontal synchronization signal HD and the vertical synchronization signal VD by a synchronization separation circuit 211 once outside the timing controller IC 203, and to perform phase adjustment on the separated horizontal synchronization signal HD and the separated vertical synchronization signal VD by an HD phase adjusting circuit 212 and a VD phase adjusting circuit 213, and then to input them to the timing controller IC 203.

As a result, although, as shown in FIG. 10, the circuit scale can be remarkably reduced when the synchronization separation circuit 204 is formed inside the timing controller IC 203 than when it is formed outside, as shown in FIG. 11, the synchronization separation circuit 211 must be formed as an external circuit of an IC, and the phase adjusting circuits 212 and 213 are required, thereby causing the circuit scale to increase greatly and leading to increased cost.

SUMMARY OF THE INVENTION

The present invention has been achieved in view of the above-described problems. An object of the present invention is to provide a camera system which is capable of realizing phase adjustment for a composite synchronization signal SYNC by only adding a simple circuit in a case in which the composite synchronization signal SYNC is used as a synchronization signal provided from the master camera.

To achieve the above-mentioned object, according to one aspect of the present invention, there is provided a camera system comprising: a timing control circuit having a synchronization separation circuit which inputs the composite synchronization signal and which separates, from the composite synchronization signal, a horizontal synchronization signal and a vertical synchronization signal which are contained therein; and a horizontal phase adjusting circuit for adjusting the phase of the horizontal synchronization signal which is separated by the synchronization separation circuit and which is output from the timing control circuit, wherein the timing control circuit inputs the horizontal synchronization signal whose phase has been adjusted by the phase adjusting circuit, and generates an internal horizontal synchronization signal and an internal vertical synchronization signal in accordance with the horizontal synchronization signal after the phase adjustment and the vertical synchronization signal separated by the synchronization separation circuit.

According to another aspect of the present invention, there is provided an external synchronization system using a composite synchronization signal, which generates an internal horizontal synchronization signal and an internal vertical synchronization signal in accordance with a composite synchronization signal containing a horizontal synchronization signal and a vertical synchronization signal, the composite synchronization signal being provided from a master apparatus, and which operates a slave apparatus in accordance with the generated internal horizontal and vertical synchronization signals, wherein the slave apparatus comprises: a timing control circuit having a synchronization separation circuit for inputting the composite synchronization signal and for separating, from the composite synchronization signal, a horizontal synchronization signal and a vertical synchronization signal which are contained therein; and a horizontal phase adjusting circuit for adjusting the phase of the horizontal synchronization signal which is separated by the synchronization separation circuit and which is output from the timing control circuit, and the timing control circuit inputs a horizontal synchronization signal whose phase has been adjusted by the horizontal phase adjusting circuit and generates the internal horizontal synchronization signal and the internal vertical synchronization signal in accordance with the horizontal synchronization signal after the phase adjustment and the vertical synchronization signal separated by the synchronization separation circuit.

In the camera system constructed as described above, a composite synchronization signal provided from an external source is input to a timing control circuit, and the signal is separated into a horizontal synchronization signal and a vertical synchronization signal by a synchronization separation circuit inside the timing control circuit. Of the separated horizontal synchronization signal and the separated vertical synchronization signal, at least the horizontal synchronization signal is output once outside the timing control circuit and is phase-adjusted by a horizontal phase adjusting circuit, after which the signal is input again to the timing control circuit. Then, inside the timing control circuit, an internal horizontal synchronization signal and an internal vertical synchronization signal, which are references for the operation of this system, are generated in accordance with the phase-adjusted horizontal synchronization signal and the synchronization-separated vertical synchronization signal.

The above and further objects, aspects and novel features of the invention will become more apparent from the following detailed description when read in connection with the accompanying drawings.

DESCRIPTION OF THE PREFERRED EMBODIMENTS

The preferred embodiments of the present invention are described below in detail with reference to the accompanying drawings.

Figure 1:
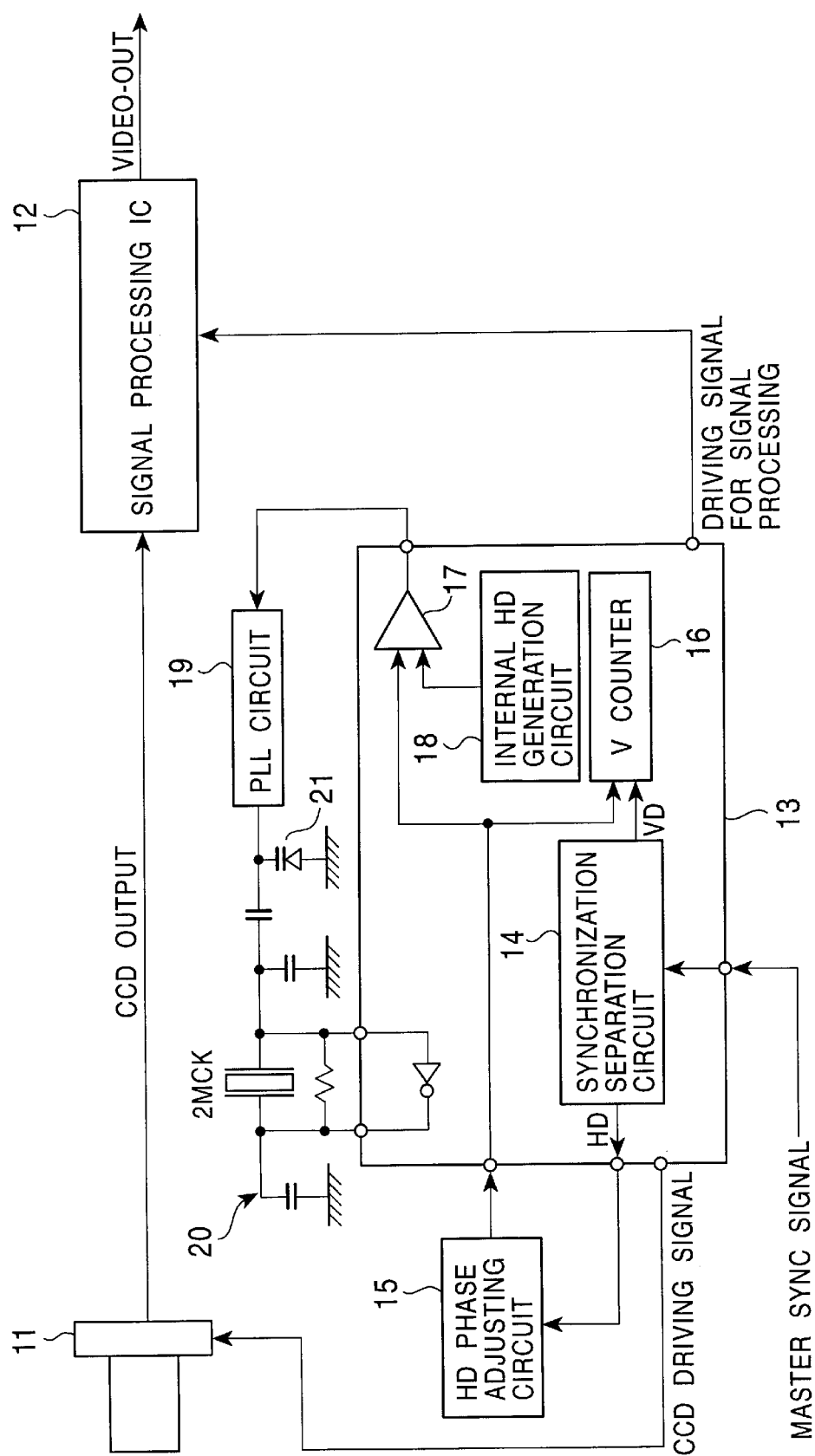
FIG. 1 is a block diagram schematically showing the construction of a camera system according to an embodiment of the present invention.

FIG. 1 is a block diagram schematically showing the construction of a camera system according to an embodiment of the present invention. Here, a description is given by using, as an example, a case in which a signal processing system for a camera is realized by an analog system. The present invention can of course be applied to a construction in which a signal processing system for a camera is realized by a digital system. This camera system is used, for example, as a slave camera in a monitoring camera system, and adopts a method in which a composite synchronization signal SYNC is used as a synchronization signal provided from a master camera.

In FIG. 1, an output signal (CCD signal) of a CCD image pickup device 11 is input to a signal processing IC 12. This signal processing IC 12 comprises a circuit (sample-and-hold circuit) for sample-holding an output signal of the CCD image pickup device 11, a circuit (automatic gain control (AGC) circuit) for amplifying the sample-held output to a fixed level, and a circuit for converting the CCD signal into a video signal.

A timing controller IC 13 is provided to generate a CCD driving signal for driving the CCD image pickup device 11, a signal processing driving signal for driving the signal processing IC 12, etc. A composite synchronization signal SYNC (master SYNC signal) provided from the master camera is input to the timing controller IC 13. The timing controller IC 13 is constructed so as to incorporate a synchronization separation circuit 14.

Inside the timing controller IC 13, the synchronization separation circuit 14 separates, from the input composite synchronization signal SYNC, the horizontal synchronization signal HD and the vertical synchronization signal VD which are contained therein. Hereafter, since the synchronization-separated horizontal synchronization signal HD and the synchronization-separated vertical synchronization signal VD are signals based on the composite synchronization signal SYNC provided from the external source, these are called an "external horizontal synchronization signal HD" and an "external vertical synchronization signal VD". The external horizontal synchronization signal HD which is synchronization-separated by the synchronization separation circuit 14 is output once outside the timing controller IC 13. Then, phase adjustment is performed by an HD phase adjusting circuit 15 which is provided outside the timing controller IC 13.

As the HD phase adjusting circuit 15, for example, an analog monostable multivibrator having a simple circuit configuration is used. The analog monostable multivibrator performs phase adjustment by providing a fixed amount of delay to the fall or rise of the signal and by shifting the phase of the external horizontal synchronization signal HD. The external horizontal synchronization signal HD whose phase has been adjusted by the HD phase adjusting circuit 15 is input again to the timing controller IC 13.

The external horizontal synchronization signal HD which is input again after being phase-adjusted inside the timing controller IC 13 is provided to a V period counter 16 and a phase comparator 17. The external vertical synchronization signal VD which is synchronization-separated by the synchronization separation circuit 14 is also input to the V period counter 16. This V period counter 16 generates an internal vertical synchronization signal VD' at a position corresponding to the phase shift of the external horizontal synchronization signal HD by inputting the external vertical synchronization signal VD as a reset signal and by detecting the fall of the external horizontal synchronization signal HD after the phase adjustment and the fall of the external vertical synchronization signal VD.

The phase comparator 17 compares the phase of the external horizontal synchronization signal HD with that of an internal horizontal synchronization signal HD' generated by an internal HD generating circuit 18 at the fall edges and outputs a comparison result corresponding to the phase difference. This comparison result of the phase comparator 17 is input to a PLL circuit 19. The PLL circuit 19 outputs a DC voltage corresponding to the comparison result of the phase comparator 17 and applies the DC voltage across both ends of a variable-capacity diode 21 of a clock oscillator 20 which generates an original oscillation clock 2MCK of a frequency twice as high as the master clock MCK which is a reference clock of this camera system.

Figure 2:
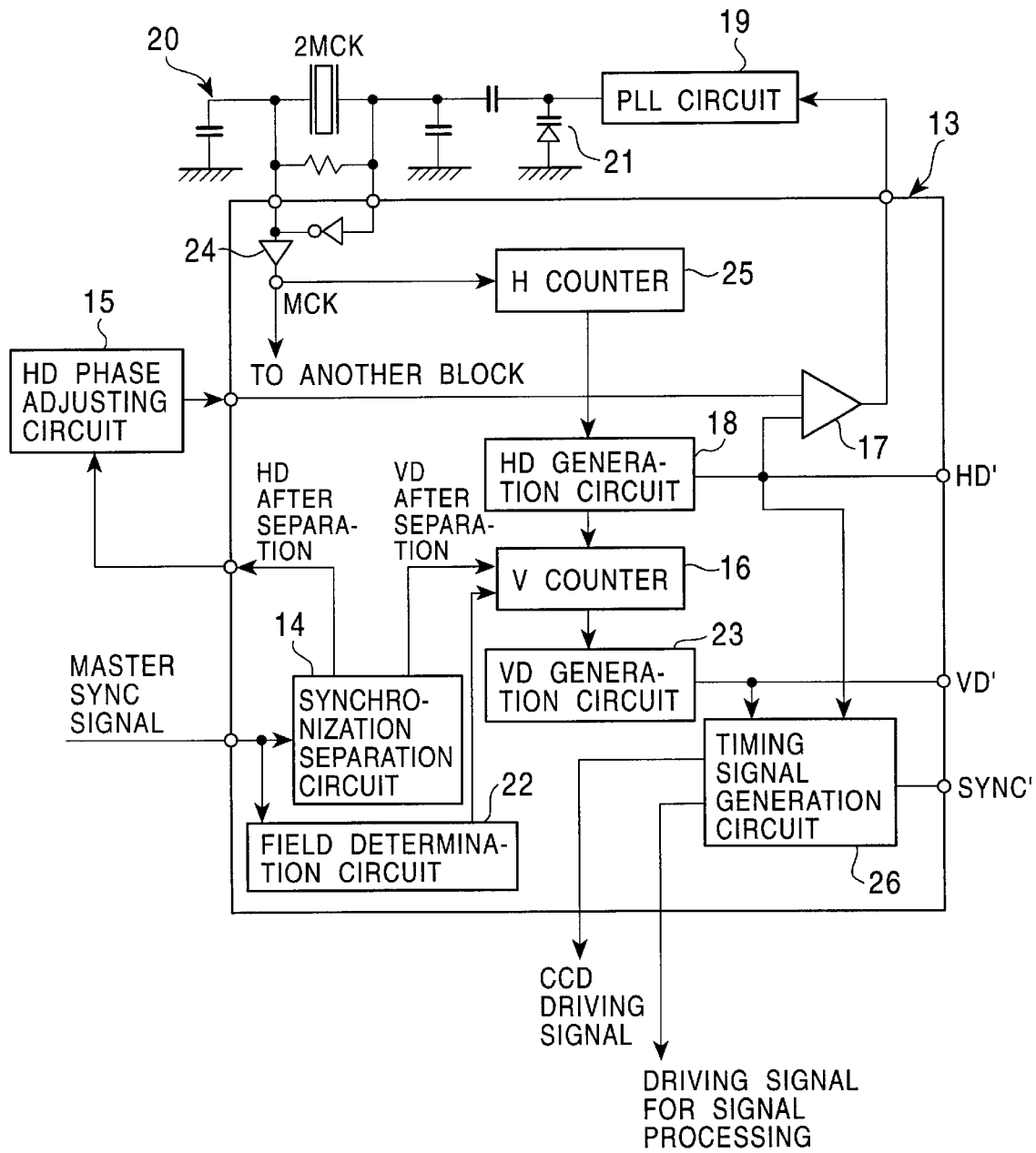
FIG. 2 is a block diagram showing the construction of the essential portion of the camera system according to the embodiment of the present invention.

FIG. 2 is a block diagram showing a more specific internal construction of the timing controller IC 13. Components in FIG. 2 which are identical to those in FIG. 1 are given the same reference numerals.

In addition to the above-described synchronization separation circuit 14, the V period counter 16, the phase comparator 17, and the internal HD generating circuit 18, the timing controller IC 13 has therein a field determination circuit 22, an internal VD generating circuit 23, a divide-by-2 frequency divider 24, an H period counter 25, and a timing signal generating section 26. Here, descriptions of parts which are the same as those in FIG. 1 have been omitted.

The field determination circuit 22 makes a determination of whether the field is an odd-numbered (ODD) field or an even-numbered (EVEN) field in accordance with the composite synchronization signal SYNC input to the timing controller IC 13, and provides the determination result to the V period counter 16. The V period counter 16 performs loading in synchronization with the fall of the external vertical synchronization signal VD in only the odd-numbered field on the basis of the determination result of the field determination circuit 22.

More specifically, as will be described later, the V period counter 16 performs the loading of a value "4" at the fall of the next external horizontal synchronization signal HD after the fall of the external vertical synchronization signal VD; the loading is performed in only the odd-numbered field and is not performed in the even-numbered field. The V period counter 16 generates an internal vertical synchronization signal VD' on the basis of the count value of this V period counter 16.

The divide-by-2 frequency divider 24 supplies the master clock MCK obtained by frequency-dividing by ½ the original oscillation clock 2MCK generated by a clock oscillator 20 to another block inside the timing controller IC 13, including an H period counter 25. Of the CCD driving signals generated by the timing signal generating section 26, the horizontal transfer clock is assumed to be generated based on the original oscillation clock 2MCK.

The H period counter 25 counts the master clock MCK and supplies the count value to the internal HD generating circuit 18. The internal HD generating circuit 18 generates an internal horizontal synchronization signal HD' in accordance with the H period counter 25. The internal vertical synchronization signal VD' generated by the internal VD generating circuit 23 and the internal horizontal synchronization signal HD' generated by the internal HD generating circuit 18 are output outside the timing controller IC 13 and further, are output to the timing signal generating section 26.

The timing signal generating section 26 generates an internal composite synchronization signal SYNC' in accordance with the internal horizontal synchronization signal HD' and the internal vertical synchronization signal VD', and generates various timing signals, such as a CCD driving signal for driving the CCD image pickup device 11 of FIG. 1, and a signal processing driving signal for driving a signal processing IC.

Next, referring to the timing charts of FIGS. 3 to 6, the circuit operation of the timing controller IC 13 in the camera system (slave camera) according to the embodiment constructed as described above is described by using the case of the EIA method, which is an NTSC-compatible black-and-white method, as an example.

Figure 3:
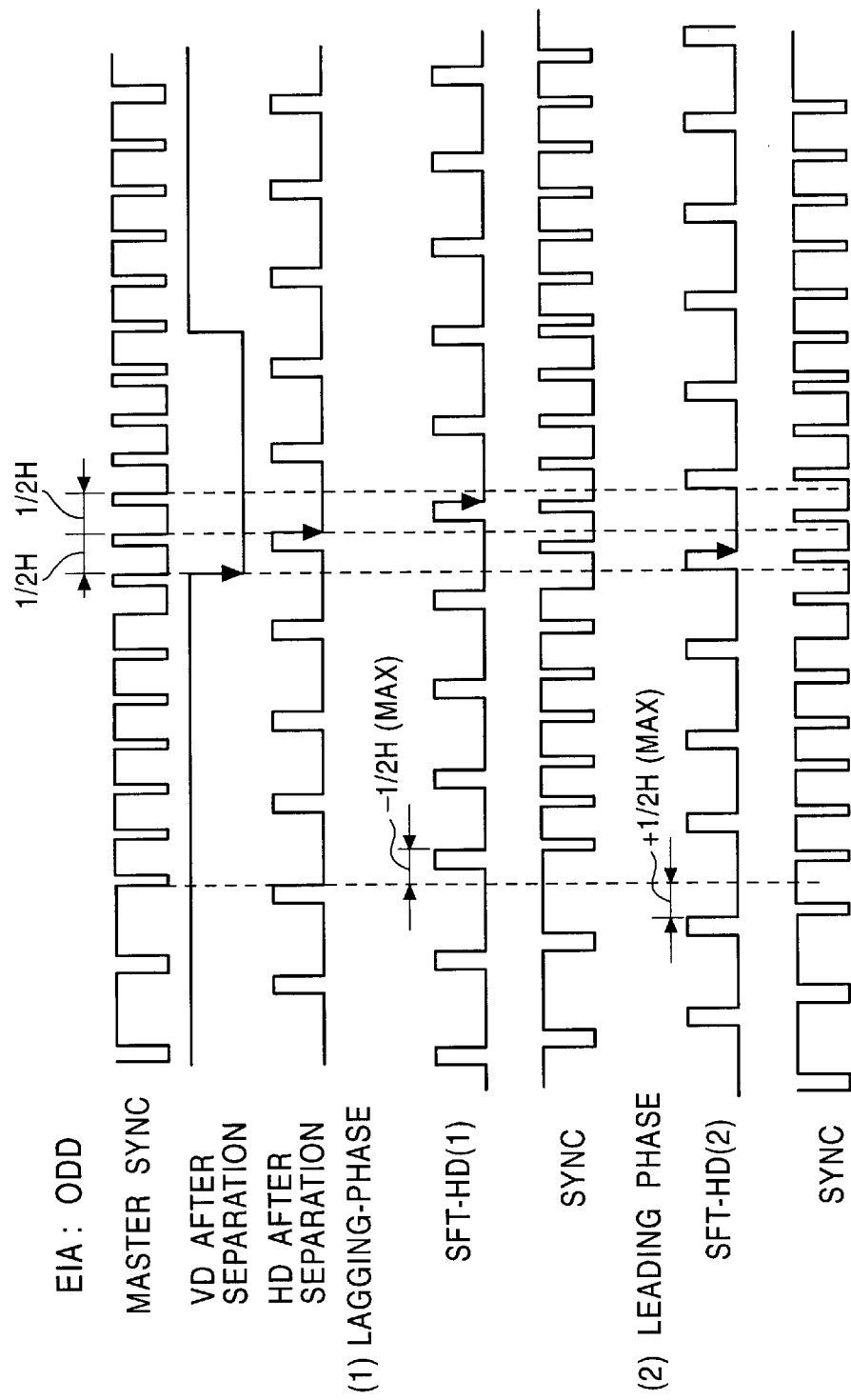
FIG. 3 is a timing chart when a composite synchronization signal SYNC is input in the case of an odd-numbered field of an EIA method.
Figure 4:
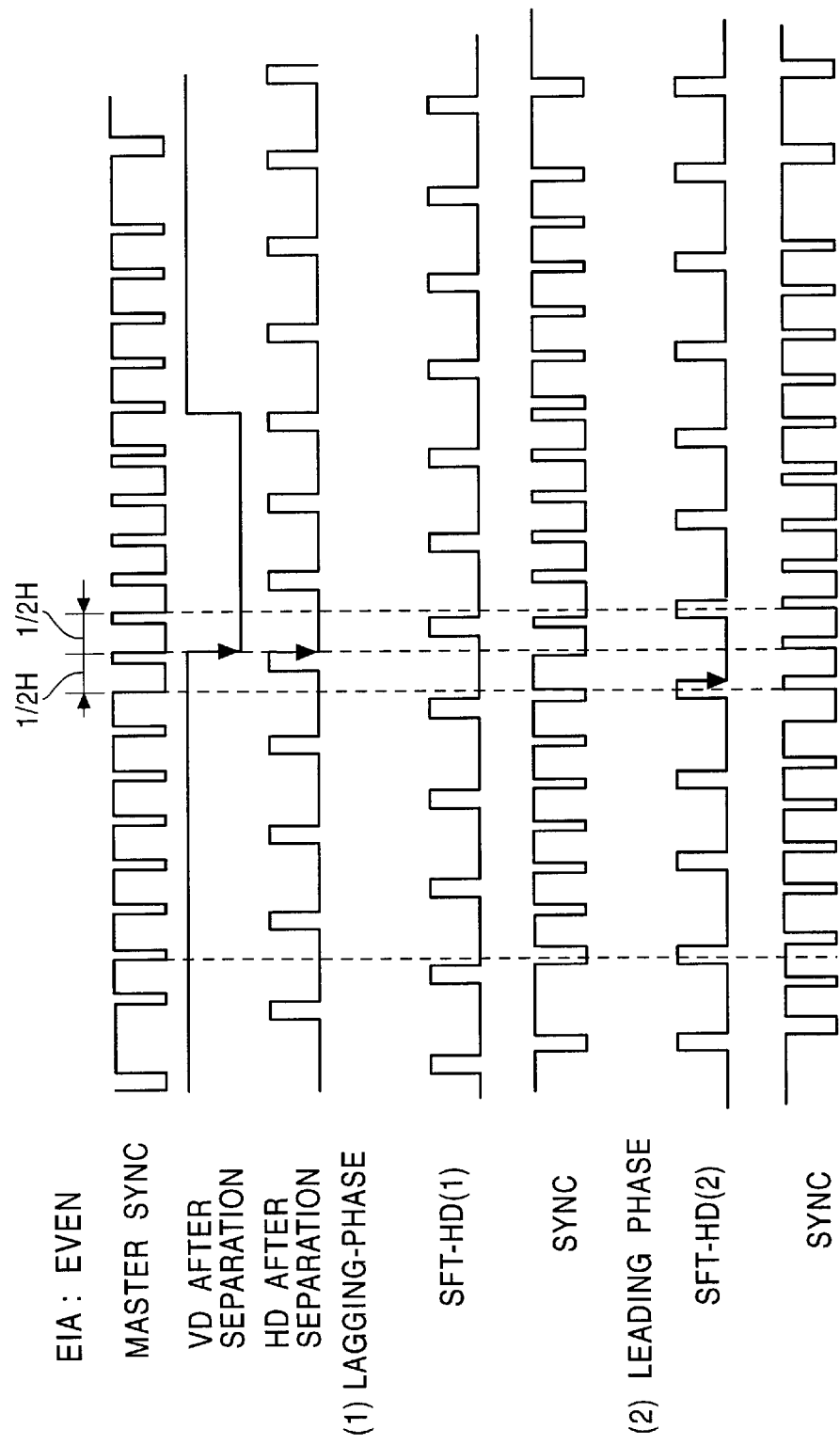
FIG. 4 is a timing chart when a composite synchronization signal SYNC is input in the case of an even-numbered field of the EIA method.

FIG. 3 is a timing chart when a composite synchronization signal SYNC is input in the case of an odd-numbered field of an EIA method. FIG. 4 is a timing chart when a composite synchronization signal SYNC is input in the case of an even-numbered field of the EIA method. In these timing charts, (1) shows a case in which the phase of the external horizontal synchronization signal HD is made to lag, (2) shows a case in which the phase of the external horizontal synchronization signal HD is made to lead, and SFT-HD (1) and (2) show signals after the separated external horizontal synchronization signal HD is phase-shifted.

Figure 5:
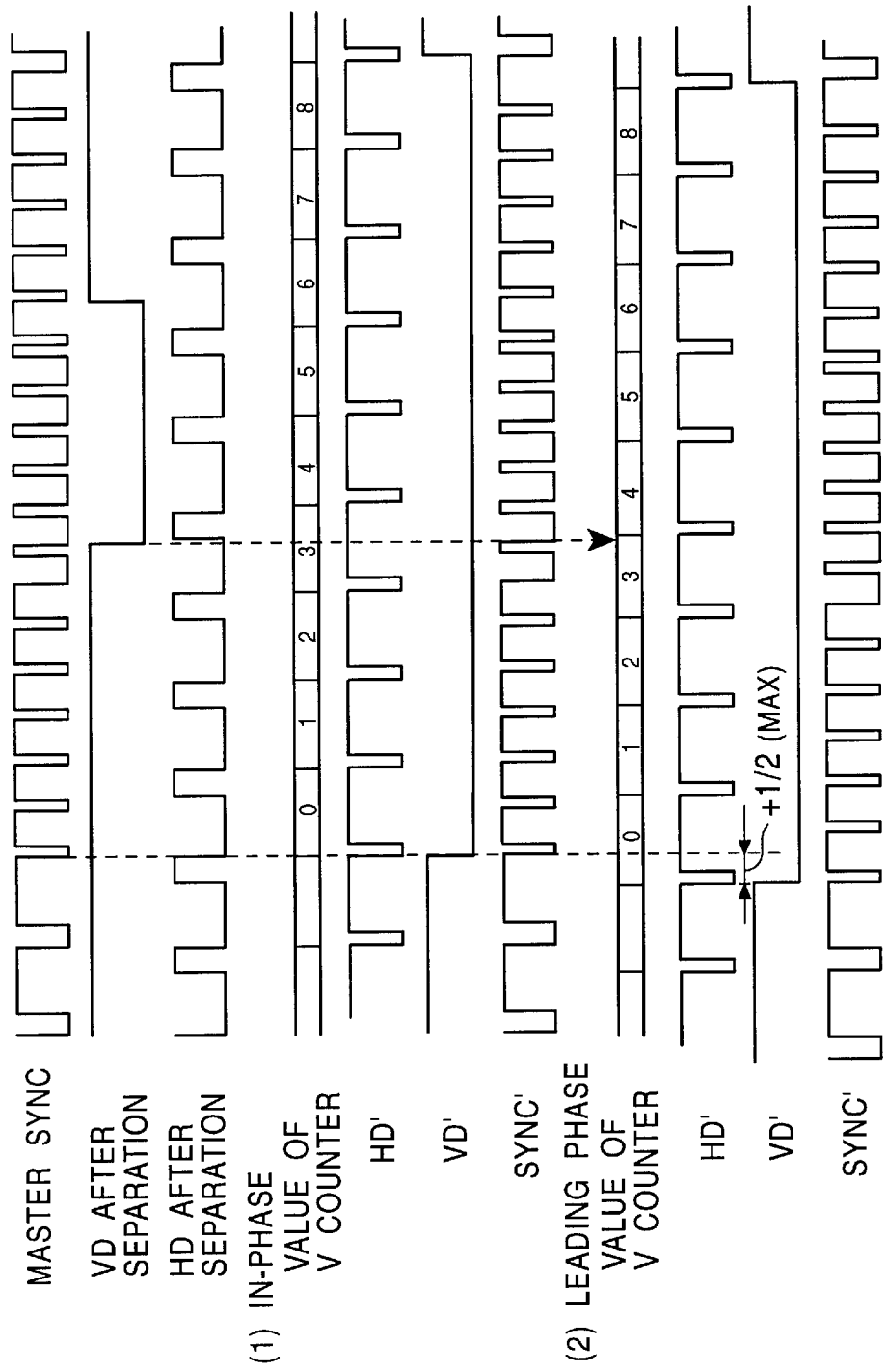
FIG. 5 is a timing chart during a phase-shift operation in the case of a leading phase in an odd-numbered field.
Figure 6:
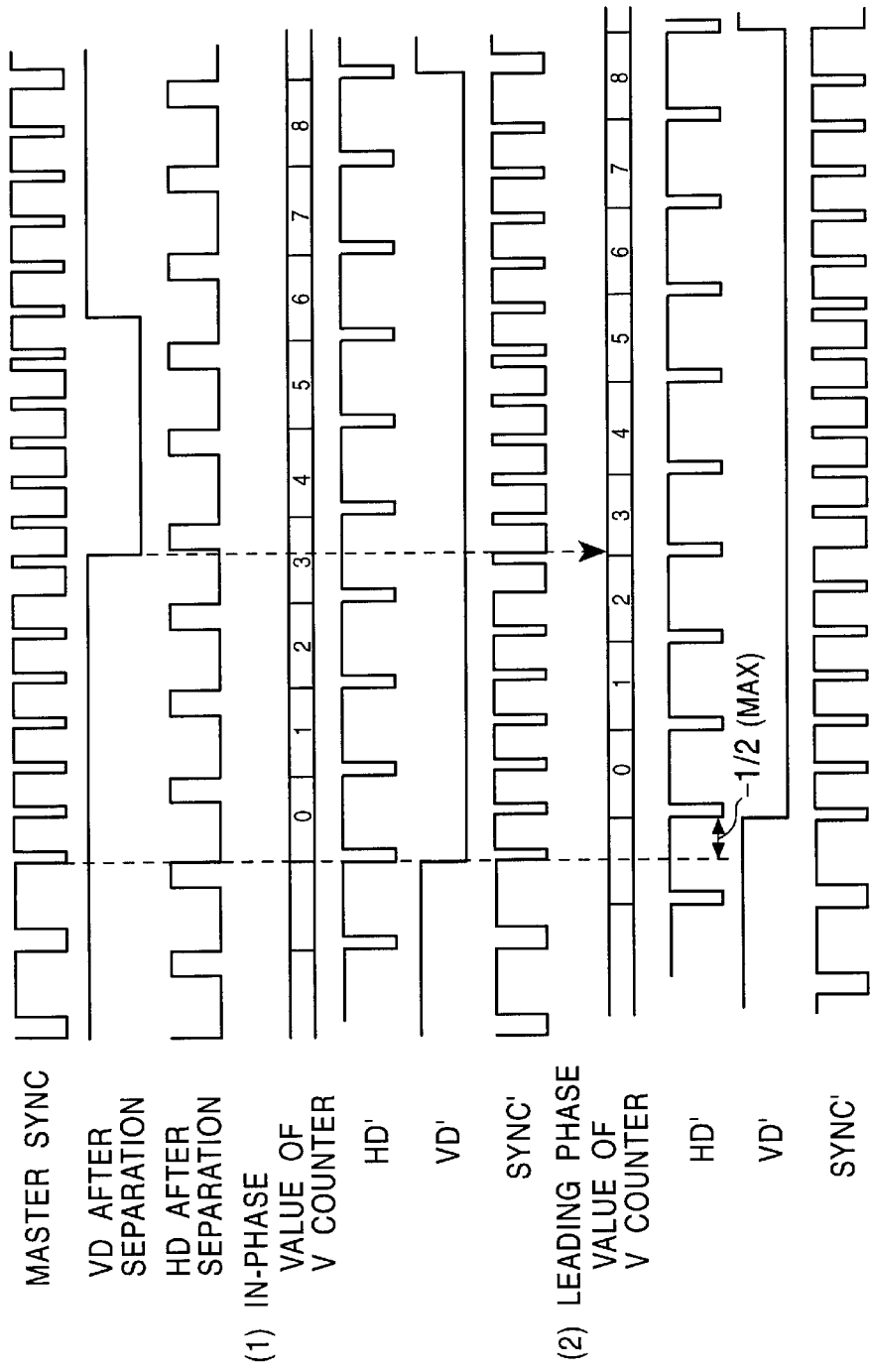
FIG. 6 is a timing chart during a phase-shift operation in the case of a lagging phase in an odd-numbered field.

FIG. 5 is a timing chart during a phase-shift operation in the case of a leading phase in an odd-numbered field. FIG. 6 is a timing chart during a phase-shift operation in the case of a lagging phase in an odd-numbered field. In these timing charts, (1) shows a case of in-phase, and (2) shows a case of leading phase/lagging phase.

Although a description is given here by using an EIA method as an example, the present invention is not limited to the EIA method, and it can be applied to a CCIR (International Radio Consultative Committee) method which is a PAL (phase alteration line)-compatible black-and-white method in a similar manner.

First, the principles of the phase adjustment in this camera system presuppose that, after the horizontal synchronization signal HD which is synchronization-separated by the synchronization separation circuit 14 in the initial step is phase-shifted by the HD phase adjusting circuit 15, the phase thereof is compared, by the phase comparator 17, with that of the internal horizontal synchronization signal HD' generated by the internal HD generating circuit 18, and the comparison result is provided to the PLL circuit 19, thereby applying horizontal phase synchronization to the original oscillation clock 2MCK.

When horizontal phase synchronization is applied, the fall of the phase-shifted external horizontal synchronization signal HD becomes almost in phase with the fall of the internal horizontal synchronization signal HD' generated by the internal HD generating circuit 18, making it possible to handle the phase-shifted external horizontal synchronization signal HD by assuming the phase shifted external horizontal synchronization signal HD to be the horizontal synchronization signal HD of this system.

On the other hand, in this camera system, as shown in the timing charts of FIGS. 5 and 6, in only an odd-numbered field, when the fall of the external vertical synchronization signal VD which is synchronization-separated by the synchronization separation circuit 14 is detected, a value "4" is loaded at the fall of the next internal horizontal synchronization signal HD'. Therefore, since NG (no good) occurs when a phase relation in which "4" cannot be loaded is reached, ±1/2H becomes the effective range of the phase shift. That is, as is clear from the timing charts of FIGS. 3 to 6, a phase shift can be realized in a range of ±1/2H at a maximum with respect to the composite synchronization signal SYNC provided from an external source.

As described above, in a camera system (slave camera) using a composite synchronization signal SYNC as a synchronization signal provided from the external source (master camera), the external horizontal synchronization signal HD which is separated by the synchronization separation circuit 14 contained within the timing controller IC 13 is output once outside the timing controller IC 13, phase adjustment is performed on this external horizontal synchronization signal HD by the external HD phase adjusting circuit 15, and an internal horizontal synchronization signal HD' and an internal vertical synchronization signal VD' are generated in accordance with the external horizontal synchronization signal HD after the phase adjustment and the external vertical synchronization signal VD which is separated by the synchronization separation circuit 14. This makes it possible to realize phase adjustment with respect to the composite synchronization signal SYNC by a simple circuit configuration in which only the HD phase adjusting circuit 15 is added.

In particular, since phase adjustment for the composite synchronization signal SYNC can be realized by using the timing controller IC 13 having therein the synchronization separation circuit 14, the circuit scale can be remarkably reduced when the synchronization separation circuit 14 is formed inside the timing controller IC 13. This makes it possible to reduce the circuit scale more than when the synchronization separation circuit 14 is formed outside the timing controller IC 13.

Figure 7:
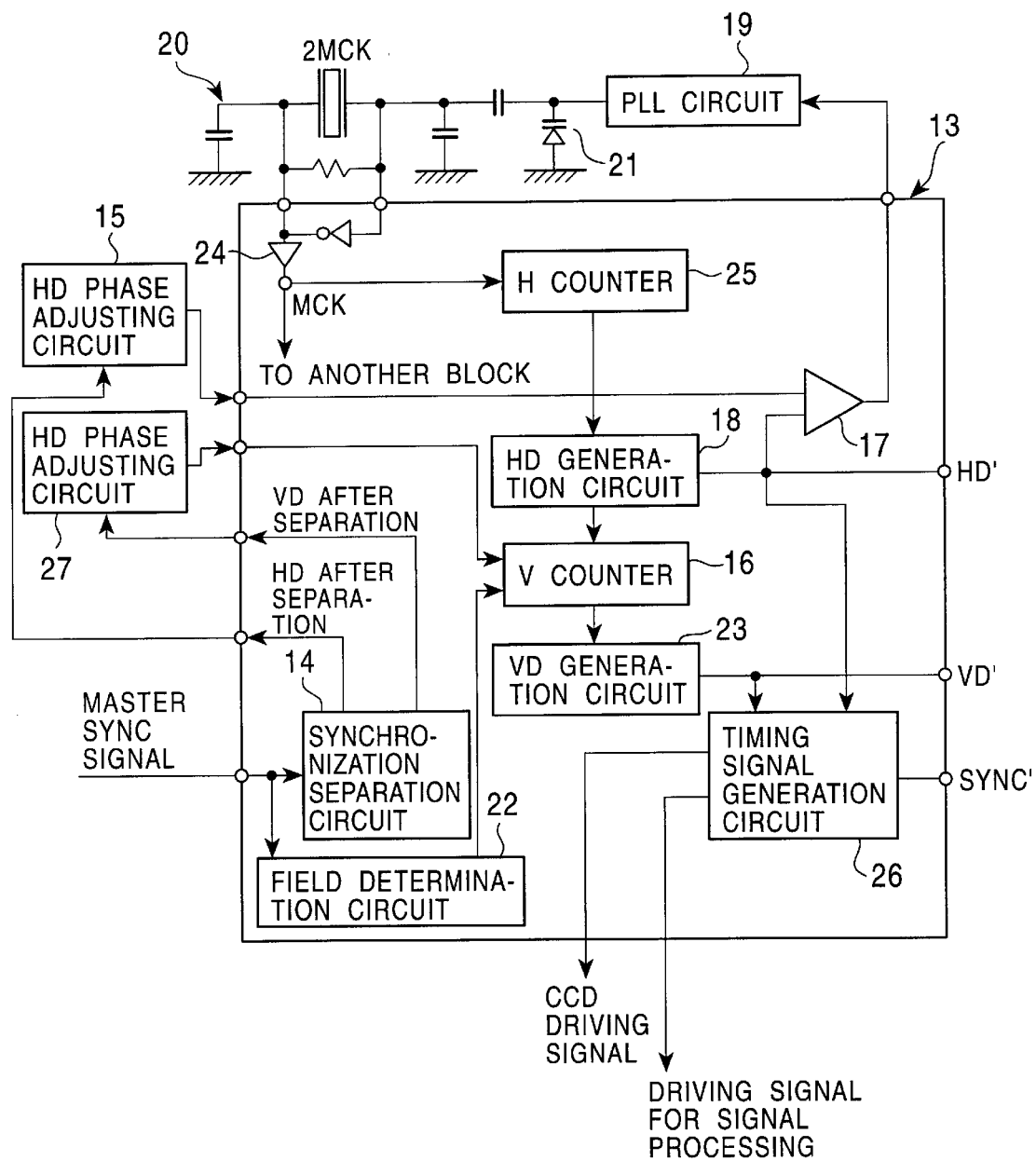
FIG. 7 is a block diagram showing the construction of the essential portion of a camera system according to another embodiment of the present invention.
Figure 8:
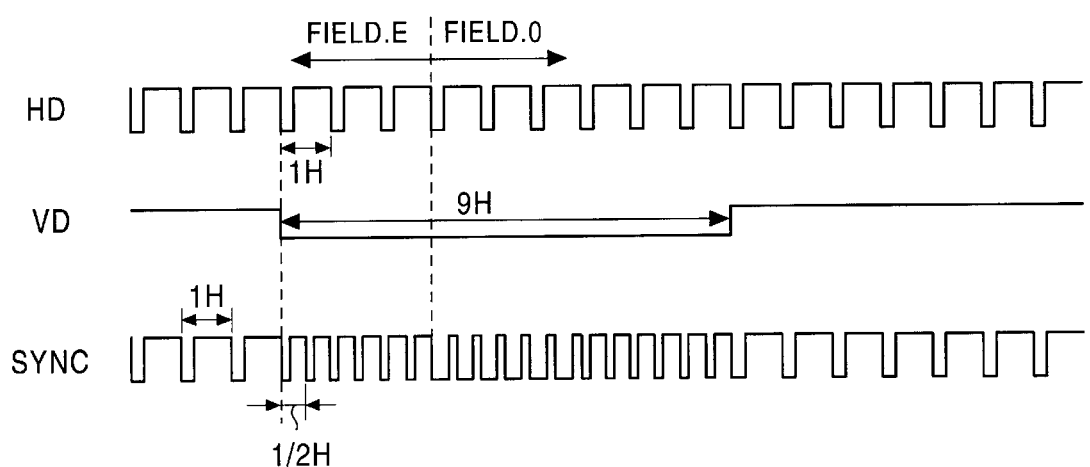
FIG. 8 is a waveform chart of a horizontal synchronization signal HD, a vertical synchronization signal VD, and a composite synchronization signal SYNC of the EIA method.
Figure 9:
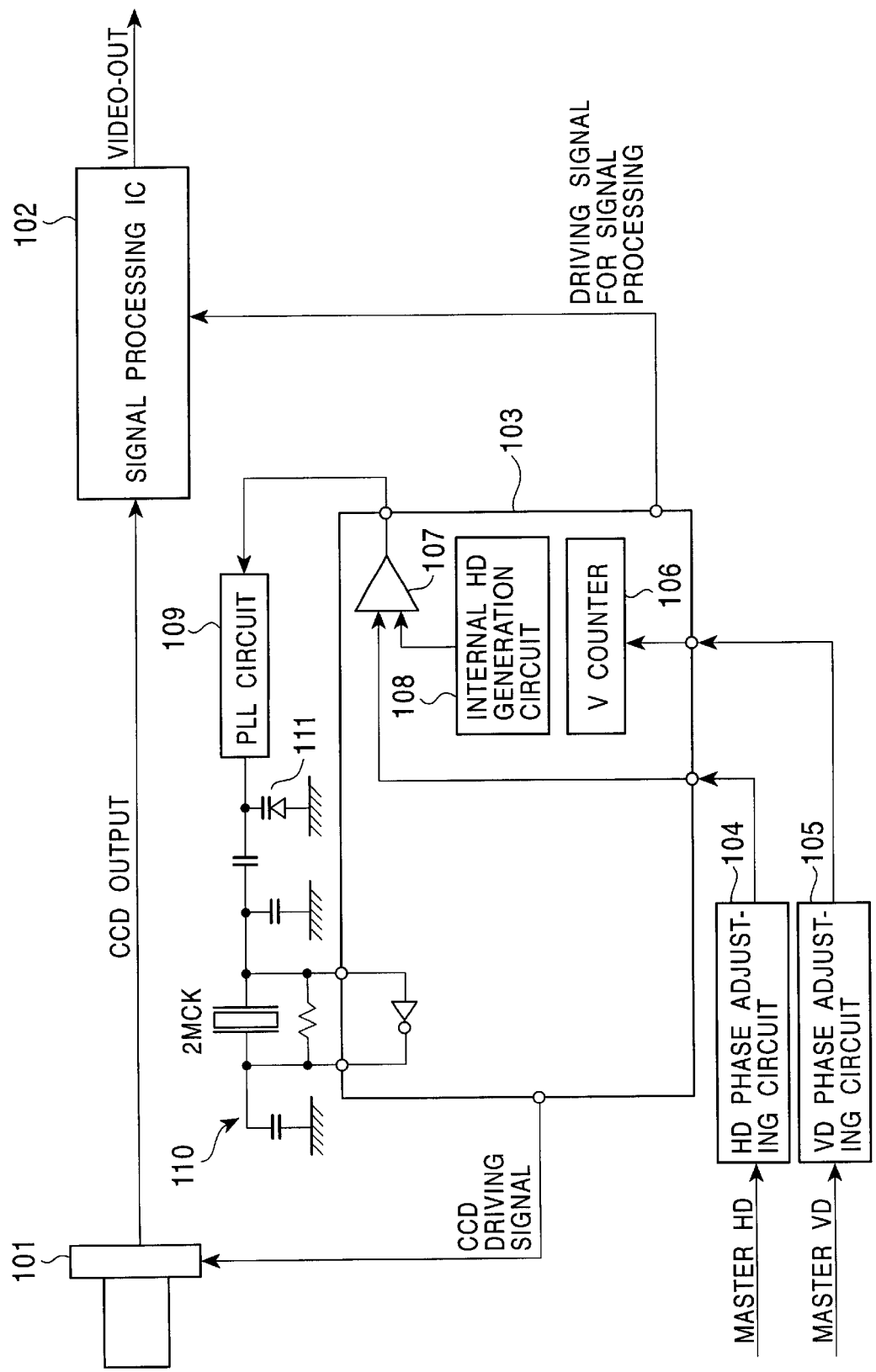
FIG. 9 is a block diagram schematically showing the construction of a camera system in which the horizontal synchronization signal HD and the vertical synchronization signal VD are used as synchronization signals provided from an external source.
Figure 10:
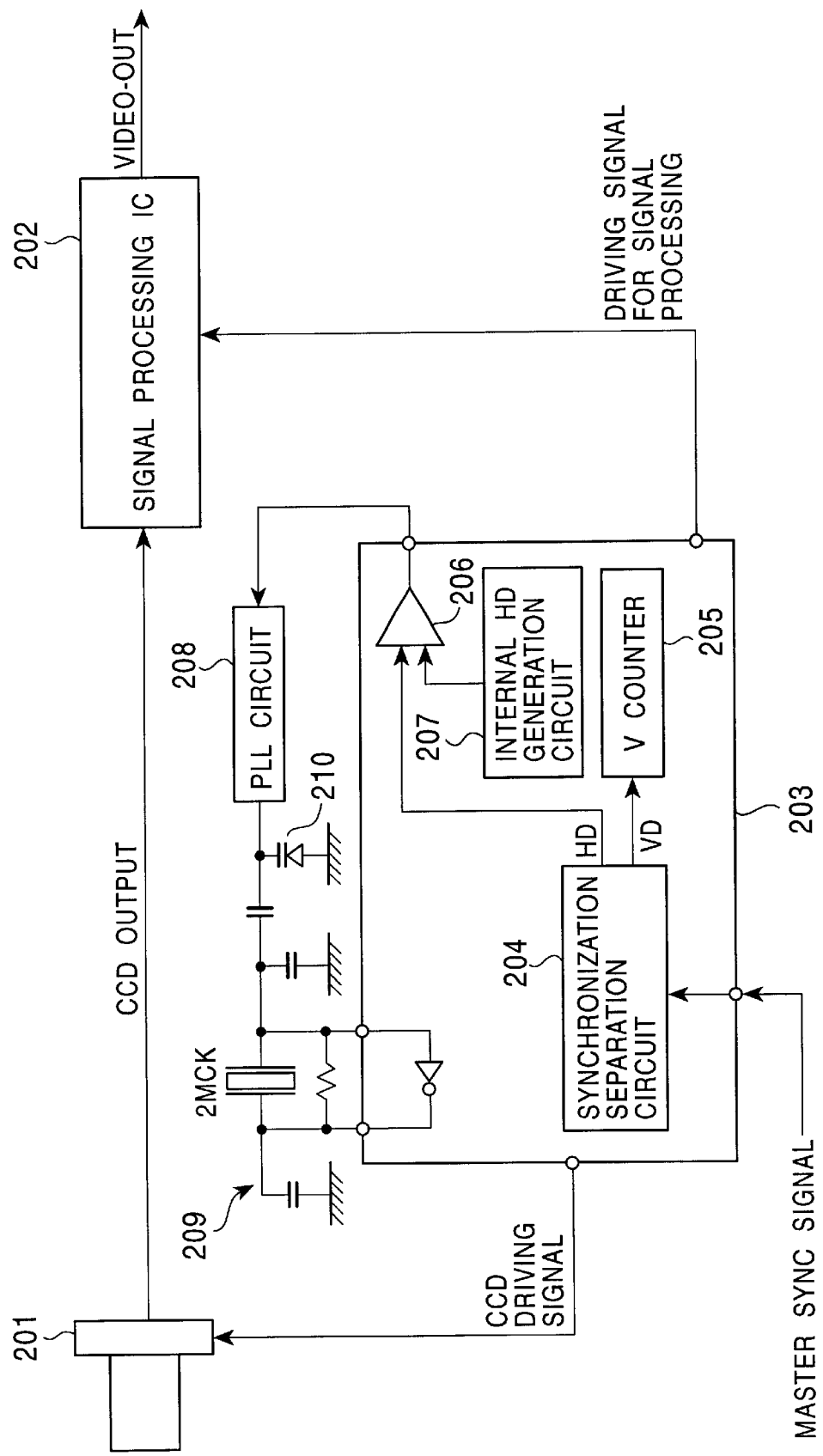
FIG. 10 is a block diagram showing the construction of a conventional example of a camera system in which a composite synchronization signal SYNC is used as a synchronization signal provided from an external source.
Figure 11:
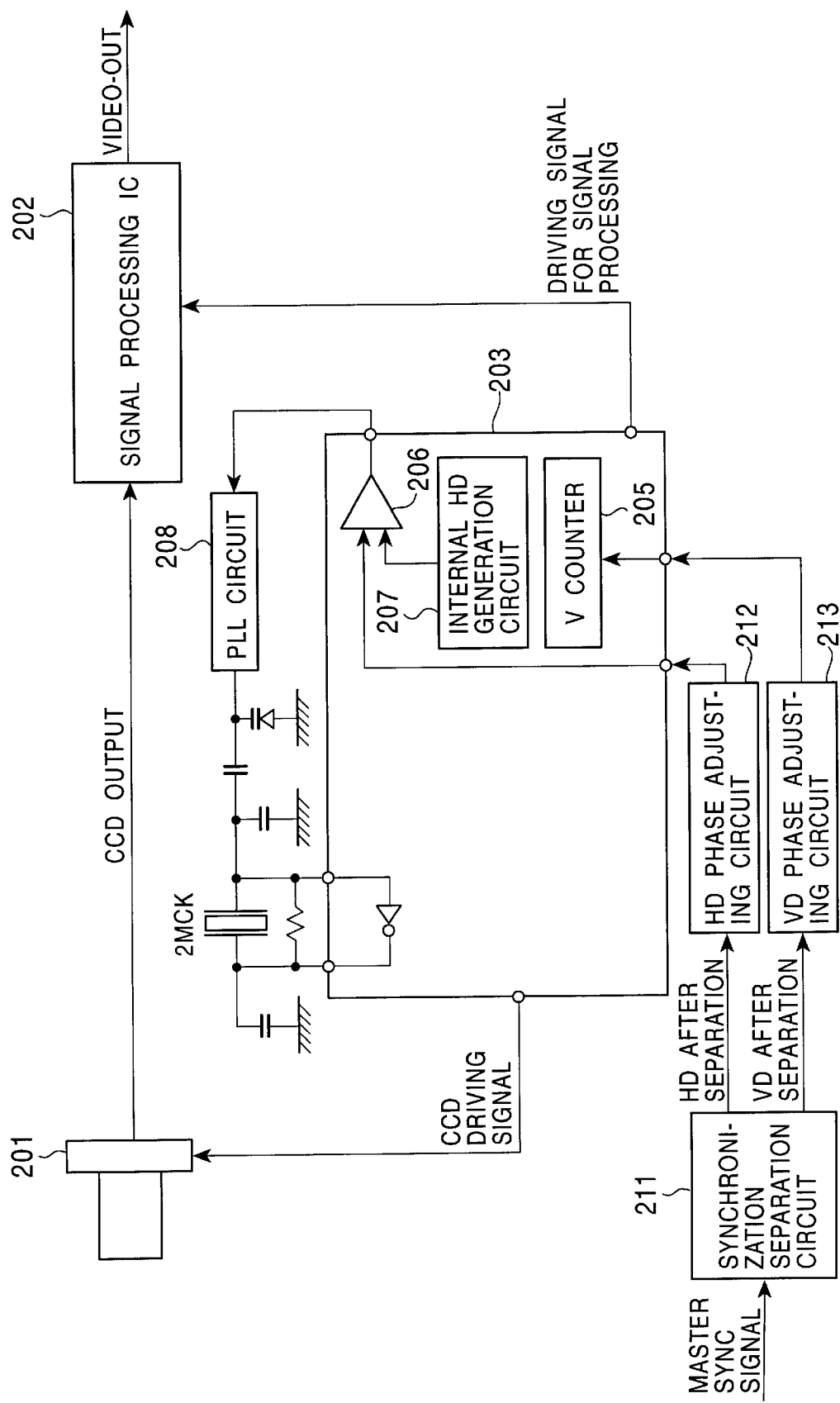
FIG. 11 is a block diagram showing the construction of another conventional example of a camera system in which a composite synchronization signal SYNC is used as a synchronization signal provided from an external source.

FIG. 7 is a block diagram showing the construction of the essential portion of a camera system according to another embodiment of the present invention. In this embodiment, in addition to the construction of the previous embodiment in which phase adjustment is performed on only the external horizontal synchronization signal HD which is synchronization-separated inside the timing controller IC 13 by the HD phase adjusting circuit 15 outside the relevant IC 13, a construction is adopted in which phase adjustment is also performed on the external vertical synchronization signal VD which is synchronization-separated inside the timing controller IC 13 by an VD phase adjusting circuit 27 outside the timing controller IC 13.

More specifically, the external horizontal synchronization signal HD and the external vertical synchronization signal VD which are separated from the external composite synchronization signal SYNC by the synchronization separation circuit 14 contained in the timing controller IC 13 are output once outside the timing controller IC 13, and they are phase-adjusted by the HD phase adjusting circuit 15 and the VD phase adjusting circuit 27 which are provided externally, after which they are input again to the timing controller IC 13. Then, the external horizontal synchronization signal HD after the phase adjustment is supplied to the phase comparator 17 in a manner similar to the previous embodiment, and the external horizontal synchronization signal HD after the phase adjustment is supplied, as a reset signal, to the V period counter 16, thereby generating the internal horizontal synchronization signal HD' and the internal vertical synchronization signal VD'.

In a manner as described above, as a result of performing phase adjustment also on the external vertical synchronization signal VD, in comparison with the case in which the range of the phase adjustment with respect to the external composite synchronization signal SYNC is ±1/2H at a maximum in the previous embodiment in which phase adjustment is performed on only the external horizontal synchronization signal HD, the range of the phase adjustment with respect to the external composite synchronization signal SYNC can be increased to one field.

Furthermore, in a manner similar to the previous embodiment, the synchronization separation circuit 14 whose circuit scale becomes very large when it is formed as an external circuit of an IC is formed as an internal circuit of the timing controller IC 13, and the HD phase adjusting circuit 15 and the VD phase adjusting circuit 27 need only be added as external circuits, making it possible to realize phase adjustment with respect to the external composite synchronization signal SYNC by a simple circuit configuration. The VD phase adjusting circuit 27 is formed by an analog monostable multivibrator in a manner similar to the HD phase adjusting circuit 15.

In addition to a monitoring camera system comprising a master camera and one or more slave cameras, the present invention can be applied to any apparatus which requires operation by obtaining external synchronization by using a composite synchronization signal. For example, the present invention may be used in a case in which the master apparatus is a camera, and one or more slave apparatuses are formed of a plurality of VCRs (video cassette recorders), and in a case in which both the master apparatus and one or more slave apparatuses are VCRs.

As has been described up to this point, according to the present invention, in a camera system using a composite synchronization signal SYNC as a synchronization signal provided from an external source, a horizontal synchronization signal which is separated by a synchronization separation circuit contained in a timing control circuit is output once outside a timing control circuit, and phase adjustment is performed on this horizontal synchronization signal by an external phase adjusting circuit, after which the signal is again input to the timing control circuit, and an internal horizontal synchronization signal and an internal vertical synchronization signal are generated in accordance with the horizontal synchronization signal after the phase adjustment and the vertical synchronization signal separated by the synchronization separation circuit. This makes it possible to realize phase adjustment with respect to a composite synchronization signal by a simple circuit configuration in which only a phase adjusting circuit is added.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A camera system for generating an internal horizontal synchronization signal and an internal vertical synchronization signal in accordance with a composite synchronization signal containing a horizontal synchronization signal and a vertical synchronization signal, said composite synchronization signal being provided as a synchronization signal from an external source, and for performing a system operation in synchronization with the generated internal horizontal and vertical synchronization signals, said camera system comprising:

image pickup means for generating image signals;

signal processing means for processing said image signals;

a timing control circuit including at least: i) a synchronization separation circuit which inputs said composite synchronization signal and which separates, from the composite synchronization signal, a horizontal synchronization signal and a vertical synchronization signal which are contained therein; ii) a period counter means for generating the internal vertical synchronization signal; and iii) a timing signal generating means for generating timing signals; and a horizontal phase adjusting circuit for adjusting the phase of the horizontal synchronization signal which is separated by said synchronization separation circuit and which is output from said timing control circuit, said phase adjustment being performed by delaying at least one of a fall and a rise of the horizontal synchronization signal and by shifting the phase of said horizontal synchronization signal, wherein said timing control circuit inputs the horizontal synchronization signal whose phase has been adjusted by said phase adjusting circuit, and generates said internal horizontal synchronization signal and said internal vertical synchronization signal in accordance with the horizontal synchronization signal after the phase adjustment and the vertical synchronization signal separated by said synchronization separation circuit, said counter means generating the internal vertical synchronization signal in correspondence to the phase shift of the horizontal synchronization signal, by inputting the external vertical synchronization signal as a reset signal and detecting a fall of the phase-adjusted horizontal synchronization signal and a fall of the vertical synchronization signal, and wherein said timing signal generating means inputs said generated internal horizontal and vertical synchronization signals, and in accordance therewith generates signals for driving the image pickup means and signal processing means.

2. A camera system for generating an internal horizontal synchronization signal and an internal vertical synchronization signal in accordance with a composite synchronization signal containing a horizontal synchronization signal and a vertical synchronization signal, said composite synchronization signal being provided as a synchronization signal from an external source, and for performing a system operation in synchronization with the generated internal horizontal and vertical synchronization signals, said camera system comprising:

a timing control circuit having a synchronization separation circuit which inputs said composite synchronization signal and which separates, from the composite synchronization signal, a horizontal synchronization signal and a vertical synchronization signal which are contained therein;

a horizontal phase adjusting circuit for adjusting the phase of the horizontal synchronization signal which is separated by said synchronization separation circuit and which is output from said timing control circuit, wherein said timing control circuit inputs the horizontal synchronization signal whose phase has been adjusted by said phase adjusting circuit, and generates said internal horizontal synchronization signal and said internal vertical synchronization signal in accordance with the horizontal synchronization signal after the phase adjustment and the vertical synchronization signal separated by said synchronization separation circuit; and a vertical phase adjusting circuit for adjusting the phase of the vertical synchronization signal which is separated by said synchronization separation circuit and which is output from said timing control circuit, wherein said timing control circuit inputs the horizontal synchronization signal whose phase has been adjusted by said horizontal phase adjusting circuit and the vertical synchronization signal whose phase has been adjusted by said vertical phase adjusting circuit, and generates said internal horizontal synchronization signal and said internal vertical synchronization signal in accordance with the horizontal synchronization signal and the vertical synchronization signal after the phase adjustment.

3. An external synchronization system using a composite synchronization signal, which generates an internal horizontal synchronization signal and an internal vertical synchronization signal in accordance with a composite synchronization signal containing a horizontal synchronization signal and a vertical synchronization signal, the composite synchronization signal being provided from a master apparatus, and which operates a slave apparatus in accordance with the generated internal horizontal and vertical synchronization signals, wherein said slave apparatus comprises:

a timing control circuit including at least: i) a synchronization separation circuit for inputting said composite synchronization signal and for separating, from the composite synchronization signal, a horizontal synchronization signal and a vertical synchronization signal which are contained therein; and ii) a period counter means for generating the internal vertical synchronization signal; and a horizontal phase adjusting circuit for adjusting the phase of the horizontal synchronization signal which is separated by said synchronization separation circuit and which is output from said timing control circuit, said phase adjustment being performed by delaying at least one of a fall and a rise of the horizontal synchronization signal and by shifting the phase of said horizontal synchronization signal, and said timing control circuit inputs a horizontal synchronization signal whose phase has been adjusted by said horizontal phase adjusting circuit and generates said internal horizontal synchronization signal and said internal vertical synchronization signal in accordance with the horizontal synchronization signal after the phase adjustment and the vertical synchronization signal separated by said synchronization separation circuit, said counter means generating the internal vertical synchronization signal in correspondence to the phase shift of the horizontal synchronization signal, by inputting the external vertical synchronization signal as a reset signal and detecting a fall of the phase-adjusted horizontal synchronization signal and a fall of the vertical synchronization signal.

4. An external synchronization system using a composite synchronization signal, which generates an internal horizontal synchronization signal and an internal vertical synchronization signal in accordance with a composite synchronization signal containing a horizontal synchronization signal and a vertical synchronization signal, the composite synchronization signal being provided from a master apparatus, and which operates a slave apparatus in accordance with the generated internal horizontal and vertical synchronization signals, wherein said slave apparatus comprises:

a timing control circuit having a synchronization separation circuit for inputting said composite synchronization signal and for separating, from the composite synchronization signal, a horizontal synchronization signal and a vertical synchronization signal which are contained therein;

a horizontal phase adjusting circuit for adjusting the phase of the horizontal synchronization signal which is separated by said synchronization separation circuit and which is output from said timing control circuit, and said timing control circuit inputs a horizontal synchronization signal whose phase has been adjusted by said horizontal phase adjusting circuit and generates said internal horizontal synchronization signal and said internal vertical synchronization signal in accordance with the horizontal synchronization signal after the phase adjustment and the vertical synchronization signal separated by said synchronization separation circuit; and a vertical phase adjusting circuit for adjusting the phase of the vertical synchronization signal which is separated by said synchronization separation circuit and which is output from said timing control circuit, wherein said timing control circuit inputs the horizontal synchronization signal whose phase has been adjusted by said horizontal phase adjusting circuit and the vertical synchronization signal whose phase has been adjusted by said vertical phase adjusting circuit, and generates said internal horizontal synchronization signal and said vertical synchronization signal in accordance with the horizontal synchronization signal and the vertical synchronization signal after the phase adjustment.

5. An external synchronization system according to claim 3, wherein said master apparatus is a camera, and said slave apparatus comprises at least one of a video cassette recorder and a camera.

6. An external synchronization system according to claim 3, wherein both said master apparatus and said slave apparatus are cameras or video cassette recorders.

* * * * *